March 29, 1938.  E. C. WINN  2,112,820
ICE CUBER
Filed May 12, 1937
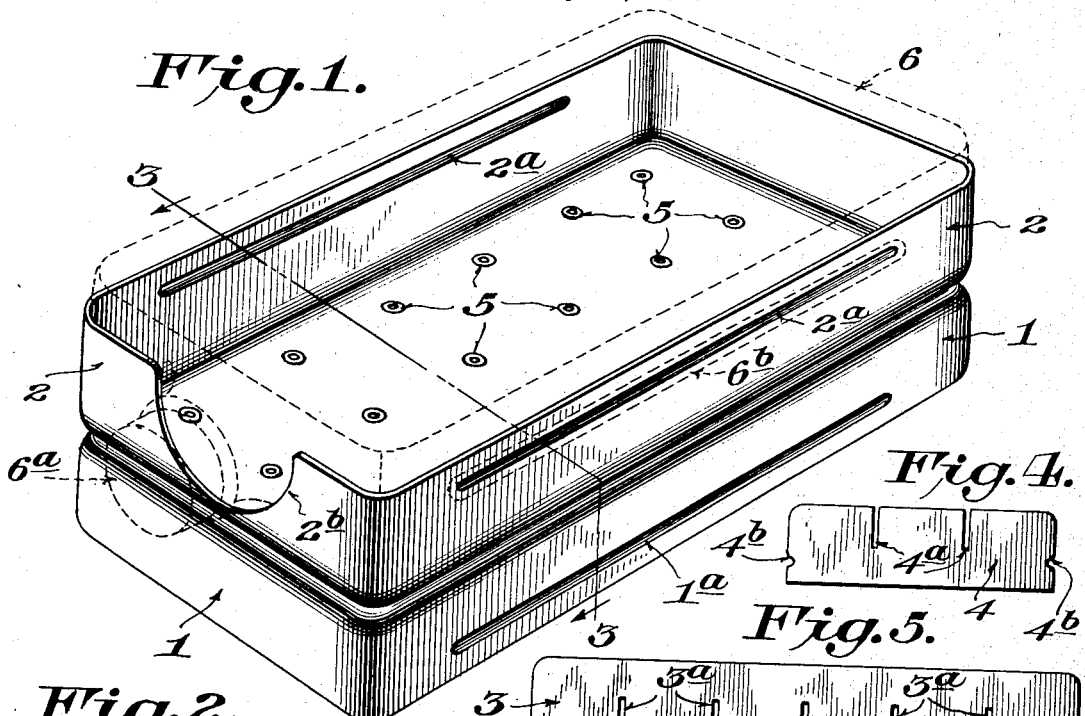
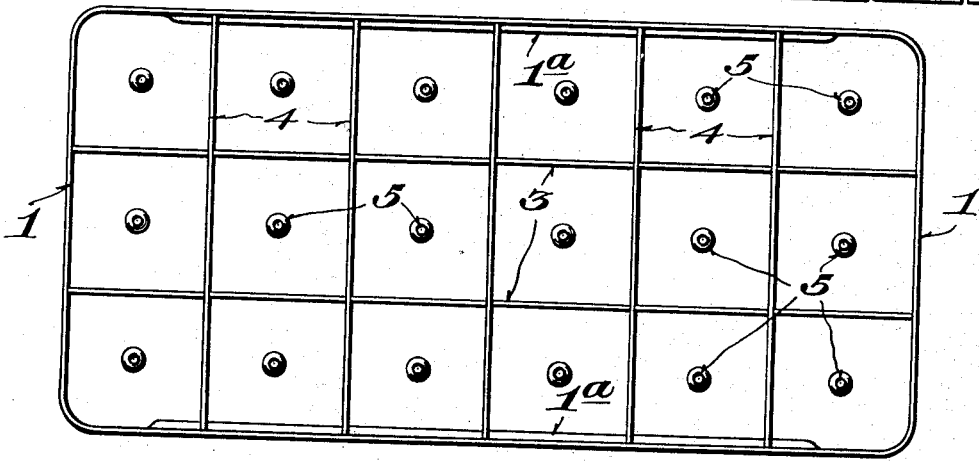
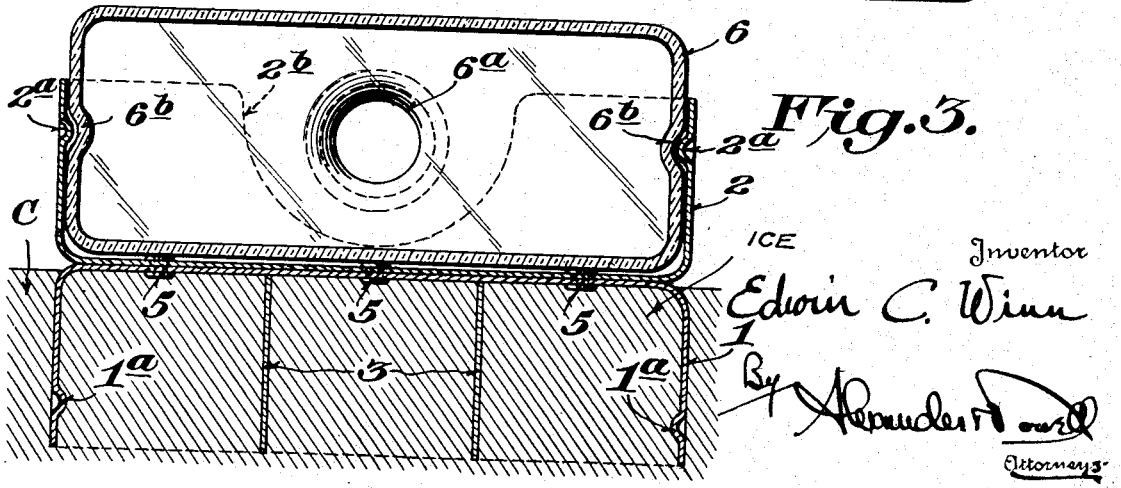

Patented Mar. 29, 1938

2,112,820

UNITED STATES PATENT OFFICE 2,112,820

ICE CUBER

Edwin C. Winn, Louisville, Ky.

Application May 12, 1937, Serial No. 142,258

8 Claims. (Cl. 62—111)

This invention is a novel ice cuber adapted to form cubes in the upper surface of a block of ice, and the principal object thereof is to provide an ice cuber having a cube cutting grid in its lower portion, and an open receptacle in its upper portion for holding a water bottle, the open receptacle with water bottle serving the threefold purpose of providing the cuber with necessary weight to cause the cutting grid to melt rapidly into the ice block, also of providing a removable bottle which may be initially filled with warm water in order to speed up the ice-cutting action of the grid, and also of providing a convenient place where a bottle of drinking water may be kept and cooled more rapidly than by merely setting such bottle inside the refrigerator or ice box.

Other minor objects of the invention will be hereinafter set forth.

I will explain the invention with reference to the accompanying drawing which illustrates one practical embodiment thereof to enable others to adopt and use the same; and will summarize in the claims, the novel features of construction, and novel combinations of parts, for which protection is desired.

In said drawing:—

Fig. 1 is a perspective view of my novel ice cuber showing in dotted lines the drinking water bottle within the open receptacle at the upper portion thereof.

Fig. 2 is a bottom plan view of the ice cuber showing the arrangement of the grid.

Fig. 3 is an enlarged transverse section on the line 3—3, Fig. 1, showing the water bottle in section.

Fig. 4 is a plan view of one of the transverse grid members.

Fig. 5 is a plan view of one of the longitudinal grid members.

The ice cuber as shown comprises a pair of pan-shaped members 1 and 2 of substantially the same length, width, and depth, but disposed back-to-back so as to form an upwardly opening bottle receiving receptacle 2 in the upper portion of the cuber, and a downwardly opening grid receiving receptacle 1 in the lower portion of the cuber. Said pans are preferably made of hard aluminum, copper or other good heat conducting material.

Within the grid receiving portion 1 is a grid formed of a plurality of spaced longitudinal grid members 3 (Fig. 5), and a plurality of spaced transverse grid members 4 (Fig. 4), the longitudinal grid members 3 having spaced slots 3a extending upwardly from their lower edges and terminating at the centers of the members, while the transverse grid members 4 have slots 4a extending downwardly from their upper edges to the centers of members, the slots 3a—4a interfitting when the members are assembled to form a grid of same height as the pan member 1. The transverse grid members 4 are provided with notches 4b (Fig. 4) adjacent their lower ends adapted to engage inwardly rolled ribs 1a in the sides of pan 1 so that the grid as a unit may be snapped into place in pan 1 and will normally remain intact therein, the arrangement of slots preventing the longitudinal grids 3 from dropping out of the pan 1, same being supported by grids 4. The grid members 3 and 4 are thus not permanently fastened together, but connected by the slots 3a and 4a. The slots 4a in the transverse grid members 4, being disposed at the upper edge, provide a solid supporting element which holds the entire grid assembly in the pan 1 when the members 4 are snapped into place.

The two pans 1 and 2 are riveted together by eyelets 5 disposed at the center of each grid compartment, said eyelets providing vents in each compartment to permit air to pass freely from the compartment above the ice cubes so that the cuber can sink down quickly into the ice block; also to permit the cuber to be readily removed from the ice block after the ice cubes are formed.

The upper pan 2 is provided with a semi-circular notch 2b at its front end to permit the neck 6a of a removable water bottle 6 to extend therethrough when lying in the pan 2 as indicated in Fig. 1, said pan 2 being also provided with inwardly rolled ribs 2a in its sides to receive correspondingly shaped recesses 6b in the sides of water bottle 6. Preferably water bottle 6 is of greater depth than the pan 2 and is snapped into place in said pan by the interengagement of ribs 2a with recesses 6b. The water bottle 6 as shown is a quart bottle of special design made to fit the upper pan 2 but it is not necessary however that the bottle should be this special type, made to snap into place, for any bottle that will fit inside of the pan 2 will function. The snap-on type however is more satisfactory.

If desired the pans 1 and 2 may be formed integrally. When made separately, as shown, one drawing die may be used to form both pans 1 and 2, and the pans may be fastened together as shown by the eyelets 5, the only difference in the two pans 1 and 2 being the semi-circular notch 2b in pan 2 for permitting the neck of the bottle to overhang the end of the pan.

In use, the bottle 6 or any ordinary quart water flask or bottle is placed in the upper pan 2 and the cuber placed upon the top of a cake of ice C, as shown in Fig. 3. The heat from the water is rapidly transmitted to the grids 3—4 causing the grids to melt down into the ice cake C forming ice cubes in the top of the ice cake. The cubes may be removed by using a flat ice pick to lift them off the cake after the cuber has been removed. The water in the bottle is cooled at a much more rapid rate than if the bottle were merely placed within the refrigerator or ice chest. The bottle 6, being snapped into place, is safe and easily available at all times.

I claim:

1. An ice cuber comprising a member having a lower grid section adapted to contact a cake of ice and having an upper pan shaped section adapted to removably receive a water bottle, said grid section comprising an inverted pan having inwardly extending ribs and a grid member within the pan having notches to receive the ribs.

2. An ice cuber comprising a member having a lower grid section adapted to contact a cake of ice and having an upper pan shaped section adapted to removably receive a water bottle, said grid section comprising an inverted pan having inwardly extending ribs, longitudinal and transverse grid members having slots respectively entering from opposite edges and interfitted to form a unit removable from the pan; the members having notches for receiving the ribs.

3. An ice cuber comprising a member having a lower grid section adapted to contact a cake of ice and having an upper pan shaped section; a water bottle in the pan section; and eyelets connecting the sections together and forming vents in the grid compartments.

4. In an ice cuber as set forth in claim 3, said water bottle conforming with the shape of the pan section; and said pan section having inwardly extending ribs engaging recesses in the bottle when snapped into place therein.

5. In an ice cuber, as set forth in claim 3, one side of the water bottle conforming with the shape of the pan section; and said pan section having inwardly extending ribs engaging recesses in the bottle when placed therein, the pan having a recess in its front end receiving the neck of the bottle lying on its side in the pan section.

6. In an ice cuber, a grid section adapted to contact a cake of ice and comprising an inverted pan having inwardly extending ribs along its sides; longitudinal and transverse grid members having slots entering from the upper and lower edges respectively and interfitted to form a unit removable from the pan; the grid members whose slots enter from the upper edges having notches in their ends receiving the ribs.

7. In an ice cuber, a lower grid section, an upper pan section having inwardly extending ribs; a water bottle conforming with the shape of the pan section and having recesses receiving the ribs to snap the bottle into place in the pan.

8. In an ice cuber, a lower grid section, an upper pan section having inwardly extending ribs, a water bottle having one side conforming with the shape of the pan section and having recesses receiving the ribs to snap the bottle into place therein, the pan having a recess in its front end receiving the neck of the bottle lying on its side in the pan.

EDWIN C. WINN.